United States Patent [19]

Ebisch

[11] 3,828,270

[45] Aug. 6, 1974

[54] CIRCUIT FOR ACCURATELY CONTROLLING THE AMPLITUDE OF A TRANSMITTER

[75] Inventor: Martin Ebisch, Hohenschaeftlarn, Germany

[73] Assignee: Siemens Aktiengesellschaft, Berlin & Munich, Germany

[22] Filed: Sept. 11, 1972

[21] Appl. No.: 288,046

[30] Foreign Application Priority Data

Sept. 17, 1971 Germany.............................. 2146690

[52] U.S. Cl................... 330/130, 325/144, 330/137

[51] Int. Cl............................................... H03g 3/22

[58] Field of Search....... 330/29, 52, 130, 132, 137; 325/397, 407, 144, 186, 187

[56] References Cited

UNITED STATES PATENTS

| | | | |
|---|---|---|---|
| 2,296,626 | 9/1942 | Blumlein | 330/130 X |
| 2,497,883 | 2/1950 | Harris | 330/130 X |
| 2,554,132 | 5/1951 | Van Zerst | 330/130 |
| 2,781,423 | 2/1957 | Kuczun et al. | 330/126 |
| 2,929,062 | 3/1960 | Huggin et al. | 330/132 |
| 3,200,336 | 8/1965 | Valakos et al. | 325/144 |

*Primary Examiner*—Herman Karl Saalbach
*Assistant Examiner*—James B. Mullins
*Attorney, Agent, or Firm*—Hill, Gross, Simpson, Van Santen, Steadman, Chiara & Simpson

[57] ABSTRACT

A circuit and system for controlling the amplitude of a transmitter wherein a variable gain amplifier receives the output of the transmitter and is controlled by a differential amplifier which receives inputs from a pair of rectifiers. One of the rectifiers receives a signal from the variable gain amplifier and the other rectifier receives an input from a low frequency oscillator whose output is supplied to the rectifier through a pair of variable attenuators which allow accurate adjustment of the input to the rectifier. One of the variable attenuators may change the amplitude of the signal in relatively large steps and the other variable attenuator accomplishes fine settings.

5 Claims, 1 Drawing Figure

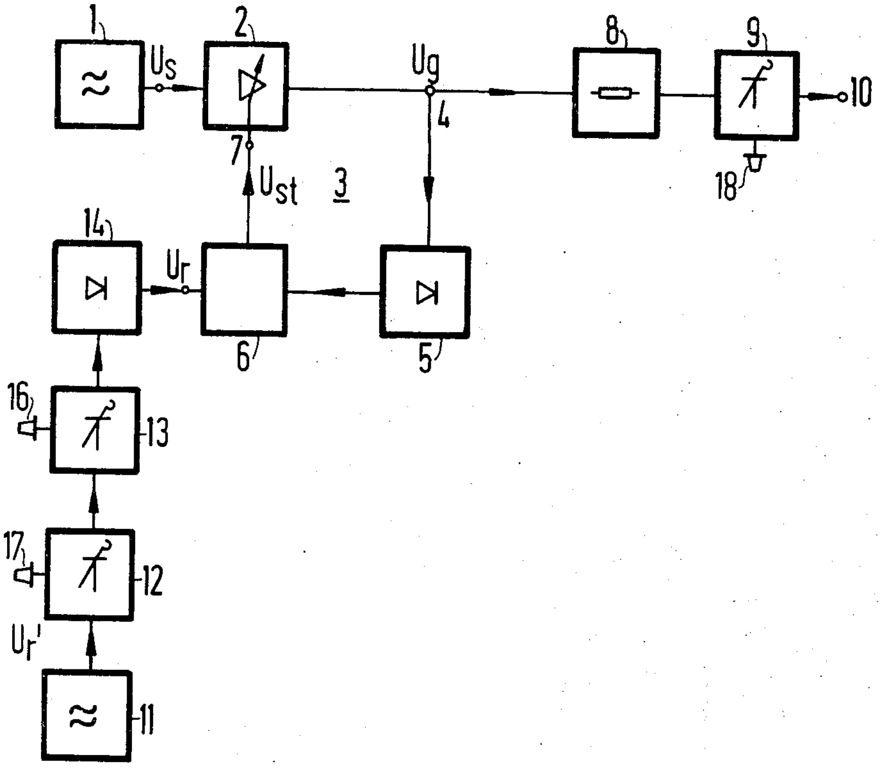
1
Us
2
Ug
4
8
9
10
18
7
Ust
3
14
Ur
6
5
16
13
17
12
Ur'
11

CIRCUIT FOR ACCURATELY CONTROLLING THE AMPLITUDE OF A TRANSMITTER

BACKGROUND OF THE INVENTION

1. Field of the Invention

This invention relates in general to automatic control circuits and in particular to circuits for automatically controlling the output signal of a transmitter.

2. Description of the Prior Art

Automatic control circuits for controlling the amplitude of transmitters have utilized a direct current voltage source as the reference voltage against which the rectified output of the transmitter is compared. Such circuits do not result in accurate control of the amplitude of the transmitter because the rectifier does not have a linear characteristic and thus the transmitter output is not maintained constant even if high gain is utilized in the servo loop.

SUMMARY OF THE INVENTION

The present invention comprises an automatic amplitude control circuit in which a reference voltage is obtained from a low frequency oscillator having substantially constant amplitude and in which the output of the low frequency oscillator is supplied to a rectifier through a pair of variable attenuators for making coarse and fine adjustments of the amplitude of the oscillator and wherein a second rectifier receives the output of a variable gain amplifier and a differential amplifier receives inputs from the two rectifiers to supply a differential output to the variable gain amplifier to control its gain. The transmitter whose amplitude is being controlled supplies an input to the variable gain amplifier.

Other objects, features and advantages of the invention will be readily apparent from the following description of certain preferred embodiments thereof taken in conjunction with the accompanying drawing although variations and modifications may be effected without departing from the spirit and scope of the novel concepts of the disclosure, and in which:

BRIEF DESCRIPTION OF THE DRAWING

The FIGURE is a schematic view of the automatic amplitude control circuit of the invention.

DESCRIPTION OF THE PREFERRED EMBODIMENT

The FIGURE illustrates the circuit of the invention for accurately controlling the amplitude of a transmitter which might be, for example, a variable frequency transmitter. The transmitter 1, whose amplitude is to be controlled, provides an output signal $U_s$ to a variable gain amplifier 2. An automatic gain control loop 3 comprises a first rectifier 5 which receives the output voltage $U_g$ of the variable gain amplifier 2 and rectifies it and supplies it to differential amplifier 6 which also receives a reference voltage $U_r$ from a second rectifier 14. The second rectifier 14 receives an input from an oscillator or generator 11 which produces an output reference voltage $U_r'$ which is supplied to the input of the rectifier 14 through the variable attenuators 12 and 13. The amplitude transfer characteristic of the variable attenuator 12 may be adjusted by the knob 17 and the amplitude transfer characteristic of the attenuator 13 may be adjusted by the knob 16.

The differential amplifier 6 supplies a control voltage $U_{st}$ to the variable gain amplifier 2 to control its gain. The control voltage $U_{st}$ corresponds to the difference between the voltages $U_g$ and $U_r$ and thus the gain of the variable amplifier 2 will be controlled until its output $U_g$ after being rectified by the rectifier 5 is equal to the voltage $U_r$ from the rectifier 14.

Assuming that the oscillator 11 produces a constant amplitude output, the output of the variable gain amplifier 2 may be varied and stabilized at different levels by setting the coarse control knob 17 of the attenuator 12 and the fine control knob 16 of the attenuator 13. Suppose, for example, that it is desired to increase the amplitude from the variable gain amplifier 2 and that a corresponding increase in amplitude is obtained at the output of the attenuator 13 by adjustment of the knobs 16 and 17, thus resulting in a larger signal $U_r$ at the output of the rectifier 14 into the differential amplifier 6. Such signal will be greater than the output of the rectifier 5 for the prior condition and thus the signal $U_{st}$ will increase the gain of the variable gain amplifier 2 until the signal $U_g$, after being rectified by the rectifier 5, is equal to the signal $U_r$ from the rectifier 14, at which time the amplitude level will be maintained constant at the level determined by the setting of the knobs 16 and 17.

A resistive network 8 may be connected between points 4 and 10 and might represent, for example, the internal impedance of the transmitter 1. Also, if desired, a variable attenuator 9 might be connected between terminal 4 and an output terminal 10 and may be provided with a level adjusting knob 18. The variable attenuator 9, for example, might be a calibration line.

The variable gain amplifier 2 which serves as the element for controlling the amplitude of the output of the transmitter at point 4 in the automatic amplitude control loop may be replaced by a variable attenuator with adjustable impedance controlled by the control signal $U_{st}$ which is supplied to terminal 7.

The direct current reference voltage $U_r$ is derived from an alternating current reference $U_r'$ which is produced by the oscillator or generator 11 and which is then passed to the variable attenuators 12 and 13 and the rectifier 14. The variable attenuators 12 and 13 may be independently adjusted by the selector knobs 17 and 16, respectively, in steps such that the oscillator 13 adjusts between large steps of the oscillator 12. Thus, by setting the knobs 17 and 16 to produce signals having different amplitudes at the output of the rectifier 14, the signal at the output of the variable gain amplifier 2 may be controlled.

The circuit illustrated wherein the oscillator or generator 11 has a relatively low frequency results in a substantially improved circuit over one wherein level control stages are provided between points 4 and 10. The advantage of the present circuit becomes even more noticeable wherein the output frequency of the transmitter 1 is relatively high and varies over a broad bandwidth. It is to be realized, of course, that the variable attenuator 9 between terminals 4 and 10 should be matched to obtain the desired electrical impedance.

In the present invention it is very important that the rectifiers 5 and 14 be selected so that their characteristics are matched and in particular that their temperature characteristics are as equal as possible. In other words, since the characteristics of rectifiers change with temperature changes, in the present invention the rectifiers 5 and 14 are selected such that their temperature characteristics are substantially the same so that accurate control of the output of the variable gain amplifier 2 is maintained even with temperature variations. The rectifiers 5 and 14 are mounted in the circuit so that they are subject to the same ambient temperature so as to maintain accurate control over broad temperature excursions.

It is to be realized, of course, that if amplitude adjustments are to be effected over very large range, coarse adjustment may be made by the variable attenuator 9 by adjusting the knob 18, whereas fine adjustments may be accomplished by the automatic amplitude control circuit including the attenuators 12 and 13. The present automatic amplitude control circuits may be used with transmitters used in test and measuring equipment as well as with transmitters whose frequencies are varied. Such test and measuring equipment as well as in other applications oftentimes require that the output level be maintained very accurately.

Although this invention has been described with respect to preferred embodiments, it is not to be so limited as changes and modifications may be made which are within the full intent and scope as defined by the appended claims.

What I claim is:

1. Means for controlling and stabilizing the output amplitude of an alternating frequency source which may contain a plurality of output frequencies comprising: a variable gain amplifier means receiving the output of said alternating frequency source; a first rectifier connected to receive a portion of the output of said variable gain amplifier means to produce an output signal indicative of the total energy content in the output of said alternating frequency source; a reference alternating frequency source; a first variable attenuator connected to the output of said reference alternating frequency source; a second rectifier having characteristics similar to said first rectifier connected to the output of said first variable attenuator, and producing an output signal indicative of the output energy of said first variable attenuator; a differential amplifier receiving the output signals of said first and said second rectifiers and producing an output signal equal to the difference in their values and said variable gain amplifier means connected to receive the output of said differential amplifier and its gain varied thereby to maintain the output signals of said first and second rectifiers equal.

2. Means for controlling and stabilizing the output amplitude according to claim 1 wherein a second variable attenuator is connected in series with said first variable attenuator between said reference alternating frequency source and said second rectifier with one of said attenuators adjustable in amplitude steps and the other attenuator adjustable over an amplitude range of one step to allow precise amplitude control.

3. Means for controlling and stabilizing the output amplitude according to claim 2, wherein a third variable attenuator is connected to the output of said variable gain amplifier means to provide coarse amplitude adjustment after stabilization has been accomplished.

4. Means for controlling and stabilizing the output amplitude according to claim 3, wherein said first and second rectifiers are mounted so as to be subjected to substantially the same ambient temperatures.

5. Means for controlling and stabilizing the output amplitude according to claim 1, wherein the output frequency of said reference alternating frequency source is lower than that of said alternating frequency source.

* * * * *